United States Patent [19]

Miller et al.

[11] Patent Number: 4,827,646
[45] Date of Patent: May 9, 1989

[54] VEHICLE SIGN DISPLAY DEVICE

[75] Inventors: Bradley J. Miller; Paul McKenna, both of 271 Weston Ct., #24, Vista, Calif. 92083

[73] Assignees: Bradley Jay Miller; Paul G. McKenna; Bernard J. McKenna; Daniel R. Miller, all of Vista, Calif.

[21] Appl. No.: 58,765

[22] Filed: Jun. 5, 1987

[51] Int. Cl.$^4$ .............................................. G09F 21/04
[52] U.S. Cl. ........................................ 40/591; 40/602; 40/642; 116/40
[58] Field of Search .................. 40/584, 591, 592, 642

[56] References Cited

U.S. PATENT DOCUMENTS

| | | | |
|---|---|---|---|
| 957,164 | 5/1910 | Johnson et al. | 116/40 |
| 1,232,995 | 7/1917 | Teijelo | 116/40 |
| 1,311,408 | 7/1919 | Lombardo | 116/40 |
| 1,445,228 | 2/1923 | Miller | 116/46 |
| 1,456,967 | 5/1923 | Bielitz | 116/44 |
| 1,500,910 | 7/1924 | Wesson | 116/46 |
| 1,526,469 | 2/1925 | Ferfelis | 116/46 |
| 1,573,660 | 2/1926 | Thompson | 40/584 X |
| 3,060,605 | 10/1962 | Flack | 40/591 |
| 3,141,253 | 7/1964 | Bartram | 40/129 |
| 3,313,053 | 4/1967 | Vogeli, Sr. | 40/10 |
| 3,359,670 | 12/1967 | Pyc et al. | 40/591 |
| 3,678,456 | 7/1972 | Gruber | 40/591 |
| 3,922,998 | 12/1975 | May | 40/592 |
| 4,178,874 | 12/1979 | Berns et al. | 40/591 |
| 4,184,276 | 1/1980 | Hernandez | 40/10 |

Primary Examiner—John Weiss
Assistant Examiner—Wenceslao J. Contreras
Attorney, Agent, or Firm—Brown, Martin, Haller & McClain

[57] ABSTRACT

A sign display device for use in vehicles such as automobiles comprising a variable height sign holder extendibly mounted on a housing or frame which has an attachment means for holding the display device on a vehicle door or similar structure. The variable height sign holder is a manually extendible structure preferably comprising a series of pairs of lever arms pivotally fastened together in the center on the ends to adjacent pairs so as to form a scissors action structure. An actuation handle is mounted on one end of the pairs of lever arms to move the ends closer together and extend the sign holder. A sign or card holder frame is positioned on an upper end of the pairs of lever arms for holding the signs to be displayed by, or stored in, the display device.

18 Claims, 3 Drawing Sheets

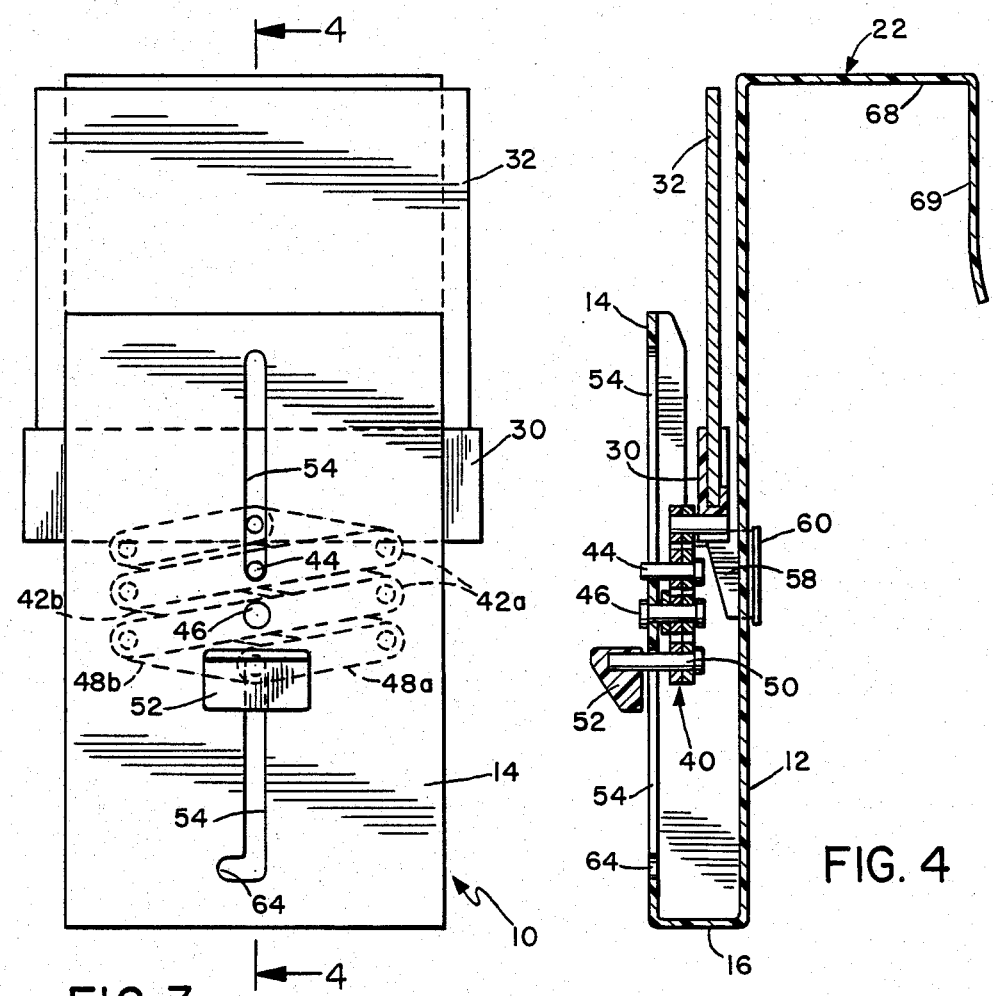
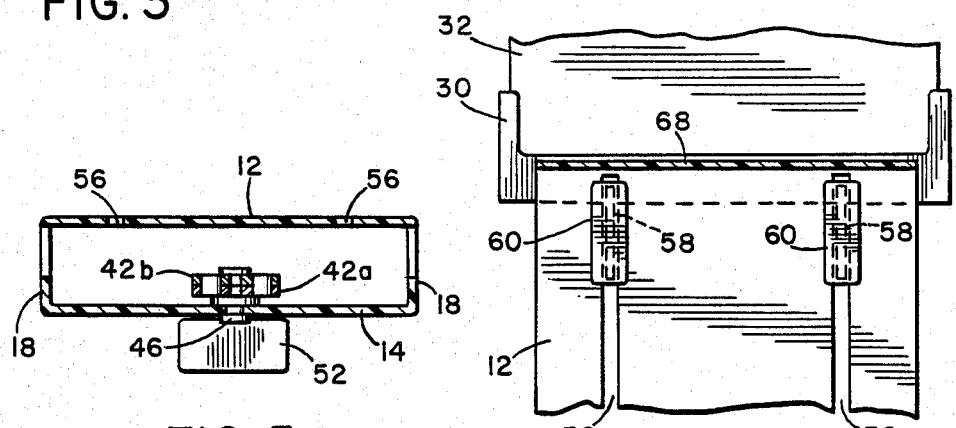

VEHICLE SIGN DISPLAY DEVICE

BACKGROUND OF THE INVENTION

1. Field of the Invention

The present invention relates to signs and vehicle signal devices and more particularly to a device for holding and displaying message bearing signs for viewing through the side windows of an automobile or similar vehicle. The invention further relates to a device for alternately displaying and storing one of a plurality of interchangeable cards or signs.

2. Background

Since the inception of the automobile, it has long been desired to display and utilize a variety of signs and signal devices in association with an automobile. Since automatic or electric turn signals were unknown in the early history of the automobile, various devices as illustrated in U.S. Pat. Nos. 1,311,408, 1,500,910, 1,445,228, and 1,232,995 were developed in order to indicate a driver's intention to turn or stop.

Such devices generally utilized some type of a clamp mechanism or housing which was secured to a support frame for the automobile front windshield and from which a scissors action support arm was extended. On the end of the support was a sign which might or might not be shaped to mimic the human hand and might further include some type of reflective material or light.

These types of devices, of course, were intended to provide adequate notice and warning to fellow drivers, or other automobiles, of one driver's intention to change direction and thereby increase safety on the roads and highways. These devices were also developed in order to improve detection or visibility of turn and stop signals at a time when high wattage electrical fixtures for indicating such maneuvers were as yet undeveloped and unknown. However, these types of signaling devices perform a very limited function of indicating changes in vehicle motion and do not provide any other type of information nor for the display of printed material which may be easily read by other drivers or pedestrians.

Even after electric turn signals had become a standard accessory for most vehicles, it was still desirable to differentiate between a moving, stopping, or slowing vehicle to minimize rear end collisions. Several specialized signaling devices were developed to allow a driver to indicate his intentions to automobiles following along behind. An example of this type of device is found in U.S. Pat. No. 1,456,967 which discloses an apparatus for storing and presenting one or more signs which indicate the driver's intent to slow down or stop. This device works by storing the signs on special racks which are slidably mounted within a housing and then raised into view as the driver presses on a brake pedal. While this invention does increase operational safety factors for an automobile, it presents very limited and specific information of a driver's intentions with regards to his speed. This type of apparatus does not display any other type of alternative information or messages which a driver may wish presented to fellow drivers or pedestrians. This type of device also cannot be readily adapted to display useful information in a cost effective manner due to its complexity and the necessity of mounting it in a fixed rearward facing location on a substantial structural portion of an automobile.

In more recent times, a variety of devices for holding vehicle registration cards, which are typically required to be in plain view in many states, have been developed. Card holders of this type are exemplified by U.S. Pat. No. 4,184,276 which discloses a specialized frame into which a registration card is placed and which is then adhesively mounted to a surface of the automobile adjacent to, or as part of, a front windshield assembly. While this type of device proves useful for the specific purpose of displaying a registration card, it does not provide an effective method of displaying any other type of message or information. It must be mounted within a very limited space to one side of the windshield in order to not block a driver's view and it does not blend well with, nor is it removable from, the overall aesthetic appearance of the vehicle.

In recent times, it has become very popular to suspend message carrying signs or sign type cards on various portions of the rear window of an automobile. This is typically accomplished using a hook attached to a suction-cup assembly with a matching hole in the sign. The signs are typically configured and printed to look like miniaturized diagonal caution signs with a variety of messages printed thereon. While this type of sign or display device has become very popular as a "fad" method of displaying various messages or derogatory comments, it has brought with it several major safety concerns.

Most notably, the suspending of one or more of these signs anywhere on a rear or front windshield has a tendency to impair the driver's visibility. Another problem with this type of sign device is the limited amount of message material that can be displayed. One sign can typically hold one message on each side, but in order to be readily viewed by the public it must be unhooked from some type of specialized holder and turned aroud. If a driver or passenger desires to display an alternative message, they have to remove one sign and hook another one in its place, which requires a fair amount of physical movement and motion and represents further distraction to a vehicle driver. Otherwise, if multiple messages are desired it is necessary to suspend more of them one these signs in a window which, of course, impairs a driver's vision. Due to the difficulty in reaching and changing a sign, many of these signs also tend to indicate inaccurate information such as "Child on Board" which is often not the case but which may cause problems in case of accidents.

What is desired then, is a method of presenting message type information to other vehicles or pedestrians which does not interfere with the visibility and other safety characteristics of an automobile or vehicle the message is displayed in. It is also desirable to be able to present such message information through the side windows of an automobile which is readily viewable by either passengers of other automobiles or pedestrians. It is also desirable to present a vast number of alternative messages, either preprinted or spontaneously generated by a passenger in the vehicle, for presentation for viewing by others without the necessity of remounting signs or sign supports to portions of the vehicle.

SUMMARY

With the above disadvantages and limitations of the prior art in mind, it is an object of the present invention to provide a device for displaying information through the side windows of a vehicle, such as an automobile, using a series of interchangeable message bearing cards.

It is another object of the present invention to provide a device for displaying messages or information through the side windows of a motorized vehicle which normally stores and maintains the message bearing media out of the field of view of the driver.

It is an advantage of the present invention that the information bearing media and all structural elements of the display device normally reside out of view from outside of the vehicle which also reduces field of view problems and increases vehicle safety.

It is another advantage of the present invention that it utilizes interchangeable message cards allowing simplified alteration of the displayed information with decreased distraction for the vehicle driver.

It is a purpose of the present invention to allow a device for displaying information through the side window of a motorized vehicle which provides the capability to display messages created spontaneously by the device operator.

It is another purpose of the present invention to provide a device for displaying messages or information through the windows of a vehicle which is inexpensive to manufacture, lightweight, and transportable between a variety of vehicles without customization.

These and other objects, advantages, and purpose are realized in a device for displaying messages through the side windows of a motorized vehicle comprising a housing having a front, a back and bottom wall and a support frame secured to an upper portion of the housing back wall. A message holder is mounted within the housing so as to retractably extend from the housing to position a message containing media above topmost portions of the housing walls and the support frame for viewing. A variable height support means is connected to the message holder and slidably mounted within the housing so as to support the message holder in both the extended position and a stored or retracted position within the housing enclosure. Manual actuation means connected to the variable height support means cause the support means to move the holder to an extended position in reponse to manual pressure by a device operator.

In a preferred embodiment, the extendible support means comprises a scissors type support frame which comprises a plurality of pairs of lever arms with each pair being pivotally connected together at a central location and adjacent pairs being pivotally connected together to the ends of adjacent pairs of lever arms. A centrally located pivot for one of the pairs of lever arms comprises a first pin passing through the lever arms and attached to the front or back walls of the housing at a fixed position with respect to a vertical axis of motion. At least a second pivot pin for an adjacent pair of lever arms positioned above the first pin, and at least a third pivot pin positioned below the first pivot pin pass through respective pairs of lever arms and through first and second vertically extending slots, respectively, in a wall of the housing.

The manual actuation means comprises two small lever members being approximately half the length of the lever arms comprising the variable height support means with each of the small lever members being pivotally attached to each other on one end and being pivotally attached to the lowermost lever arms the support means on their opposite ends. A handle is attached to a pin passing through or forming the lower pivot point for these two small levers for exerting a downward pressure on these levers.

In further aspects of the invention, the support frame comprises a generally square U-shaped member for extending over and securing onto a vehicle door frame or ridges thereon. The housing and support frame generally comprise a lightweight plastic material which provides a long life and inexpensive to manufacture assembly. The message holder comprises a generally rectangular or semicircular channel member having a beveled slot on the inner edges thereof for accepting and confining a message card.

Cards utilized in the present invention typically have preprinted messages and are dimensioned to form readily interchangeable cards without undue effort or the need for careful alignment. In one embodiment of the present invention, the cards are made of the same interchangeable dimensions and material with no message imprinted thereon but utilize a surface which is capable of being written on by a writing instrument.

BRIEF DESCRIPTION OF THE DRAWINGS

The novel features of the present invention may be better understood from the accompanying description when taken in conjunction with the accompanying drawings in which like characters refer to like parts and in which:

FIG. 3 is a front view of the sign display device of FIG. 1 with the mechanism retracted;

FIG. 4 is a sectional view taken on line 4—4 of FIG. 3;

FIG. 5 is a sectional view taken on line 5—5 of FIG. 1;

FIG. 6 is a sectional view taken on line 6—6 of FIG. 2;

DETAILED DESCRIPTION OF A PREFERRED EMBODIMENT

The present invention provides a sign holding or display device capable of displaying a series of interchangeable cards having preprinted information thereon through the side windows of a motorized vehicle. Alternatively, the interchangeable cards are supported in a stowed position which is totally out of the field of view of the driver and passengers of the motorized vehicle. This is accomplished in an automotive sign device comprising a housing which supports, and from which extends, a variable height sign support structure which is manually actuated by a vehicle passenger or driver. Resting on top of the variable height support structure is a sign holder which accommodates one or more interchangeable signs of a predetermined size. Signs may be preprinted or allow for the spontaneous entry of messages by a device user.

Figure 1:
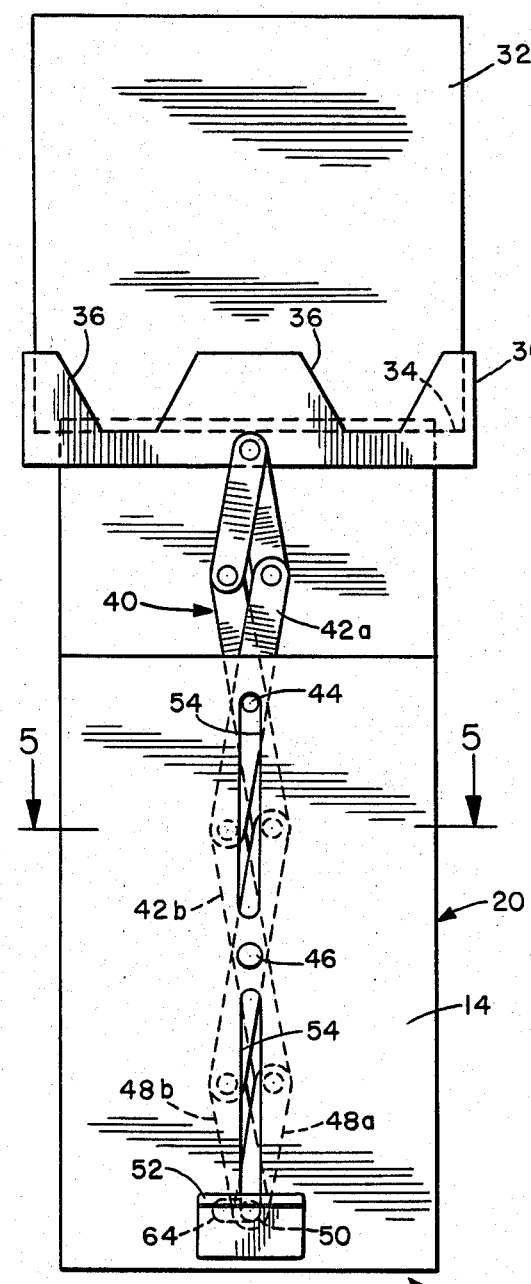
FIG. 1 is a front elevation view of a sign or display device constructed according to the present invention with the mechanism fully extended.
Figure 2:
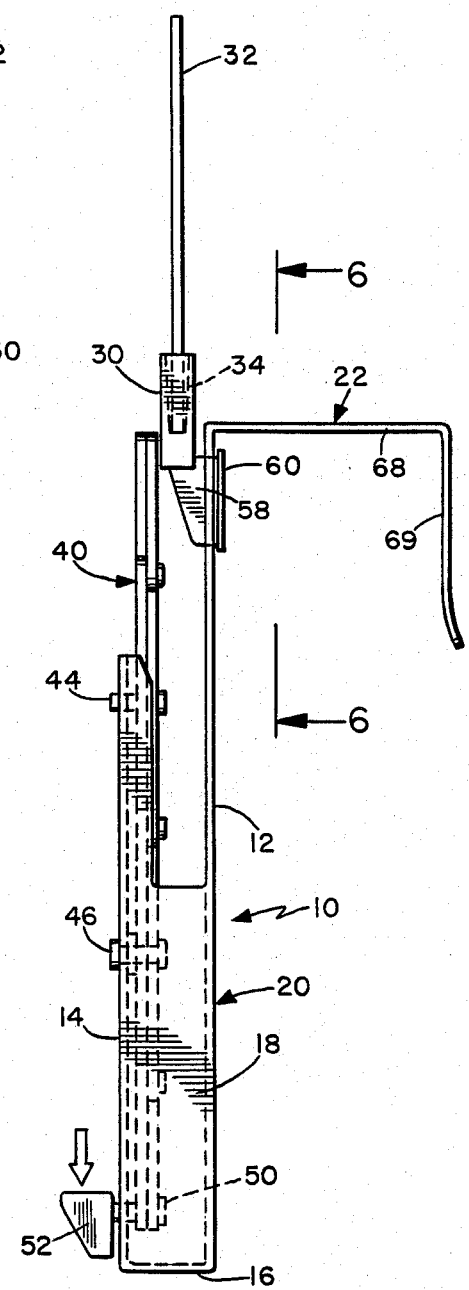
FIG. 2 is a side elevation view of the sign display device of FIG. 1.

A sign holding or display device constructed according to the principles of the present invention is illustrated in an extended position in the views of FIGS. 1 and 2. In the side view of FIG. 2, the sign device 10 is shown having a back wall 12, a front wall 14, and a bottom wall 16 which form a generally rectangular housing 20 having two narrow open sides. If desired two optional side walls 18, which are not shown for clarity of illustration in the internal function of the invention, can be employed to form a completely enclosed housing to prevent access to the inner mechanism by children or miscellaneous debris. The housing 20 is suspended in place on a vehicle door utilizing a support clip 22 secured to the upper end of a back wall 12.

The housing walls 12, 14, 16, 18 and the support clip 22 can comprise one of a variety of materials commonly used to construct automobile accessories such as, but not limited to, a lightweight plastic or metal. An exemplary housing 20 can be made from an injection molded acrylic or polystyrene plastic, a heat formed acrylic plastic sheet, or an extruded or pressure formed sheet aluminum material. Where sheet material is used, the housing 20 and the support clip 22 can be formed as a single uniform planar member which is folded at several locations so as to form the separate front, bottom, and back walls and support clip extensions as illustrated in FIG. 2. In the alternative, these parts may comprise separately formed metallic or plastic materials which are bonded together along their edges utilizing an appropriate adhesive or, in the case of metals, welding and the like.

When a unitary structure is used for the walls 12, 14, and 16 and the bracket 22, the interior elements or parts for the display device 10 are easily inserted between the walls by flexing the walls 12 and 14 apart and slipping the parts into position between the walls. Typically, the material of wall 16 is not formed from brittle material and elastically deforms or has a reasonable amount of displacement available for flexible adjustment of the side walls 12 and 14.

As shown in the figures, the display device 10 utilizes a support element or card holder 30 to actually support card stock or thin planar material bearing messages for display. The card holder is typically made from materials similar to the remainder of the display device 10 such as a molded plastic or a formed or extruded aluminum material.

The card holder 30 generally comprises a slotted member in which an edge or edges of a card 32 are inserted for support. In order to prevent accidental ejection of the card due to sudden vertical motions or forces applied to the vehicle, such as when the vehicle is traveling on rough or uneven roads, or from wind turbulence through open windows and the like, it is often desirable to have vertical support arms projecting up along the sides or face of the card which are also slotted for restraining the card.

While the present embodiment is illustrated utilizing a square card inserted into a generally square card holder 30, the principles of the present invention are by no means limited to this specific geometric configuration. That is, in many applications it is preferred that the card holder 30 have an arcuate shape to it so as to match or conform to a bottom edge of round card stock. This is very advantageous for the sign display device 10 user in that the cards tend to be self centering and self guiding which eliminates the need for careful examination or observation of the display device 10 while a new card is being inserted into the device. This provides the advantage that a minimum amount of distraction is caused for a vehicle driver or passengers while inserting new messages into the display device 10. It is also advantageous to eliminate or decrease the level of care or skill that is required in order to align or position a card 32 in the card holder 30.

Other card shapes and card holder 24 configurations can be used to achieve the advantages of the present invention. An exemplary alternative would comprise a card holder 30 as illustrated in FIG. 1 with two or more angular depressions 36 in a generally rectangular body. A slot 34 for holding the card 32 is formed along all of the upward facing edges. The card 32 has two or more matching projections which slide into the depressions 36 and the slot along the edges.

In addition to having a self aligning shape when viewed at an angle perpendicular to the walls 14 and 16 of the display device 10, the sides of a card holding slot 28 are angled, at least in an upper portion, so that the card 32 is initially guided into the slot 34 before being confined in a narrower portion. At the same time, the edges of the card 32 interacting with the slot 34 can be angled or beveled to mate with the angled slot 34 walls and form a tight fit.

In order to support the card holder 30 and provide for presentation of messages as well as removal of those messages from view, a special variable height support structure 40 is provided within the housing 20. The variable height support structure 40 comprises a series of lever arms or extension elements that are pivotally secured together and operate in a "scissors" like fashion to vary the vertical height of the card holder 30. This type of mechanical structure is well known or understood by those skilled in the basic mechanical arts. This type of structure comprises pairs of lever arms which are rotatably secured together at positions centrally located along their respective lengths. The pairs of lever arms 42 then form an X shaped pattern with the lever arms pivoting about a central pivot pin 44.

The pivot pin 44 comprises a rivet member which is inserted through holes in the levers 42a and 42b and then flattened on its ends to prevent removal. Such pivots can be made from a number of materials such as a soft plastic or metal and are well known in the mechanical arts. In the alternative the pivot pin can have a threaded end which is secured in one of the lever arms.

Adjacent pairs of lever arms 42 are then pivotally attached together on the ends of adjacent levers 42. To allow for pivoting of pairs of lever/arms 42, the lever arms are attached to the levers 42b and so forth in an alternating fashion. This provides a mechanism that extends in length as the ends of the lever arms are moved closer to each other, and decreases in overall length or vertical height when the ends of the lever arms 42 are moved away from each other.

In order to provide a fixed vertical height from which the sign display device 10 extends the holder 30, a main pivot pin 46 is positioned in a fixed vertical position along the height of the housing 20. In a preferred embodiment, the pivot pin 46 is secured through a hole in the front wall 14. However, for specific applications the pivot pin 46 may be also or alternately secured to the back wall 12 depending on the specific restraints of the manufacturing process for the sign display device 10.

As two of the lever arms 42a and 42b are rotated about the pivot pin 46 the other pairs of lever arms are similarly moved about their central pivot points and the support structure 40 is caused to either extend or retract itself. In order to cause the lever arms 42a and 42b to move or rotate, a special set of short actuation lever arms 48a and 48b are secured to the ends of the lowermost pair of lever arms 42a and 42b. For purposes of clarity in illustration, the lever arms 48a and 48b are shown secured to the lever arms 42a and 42b which also pivot about the pivot pin 46. However, for applications where a larger number of lever arms 42 are utilized it is not required that the lever arms 48 be positioned immediately adjacent to the pivot pin 46.

The opposite ends of the lever arms 48a and 48b are joined together using a pivot pin 50. To provide for actuation of the display device 10, the pivot 50 is extended out through the front wall 14 where it is attached to a handle 52. The handle 52, which comprises material such as a molded block of plastic, allows a device 10 user to push down on the handle 52 and thereby push down on the lever arms 48 and likewise collapse or force the ends of the lever arms 42a and 42b together, extending the support mechanism 40. Upon release of the handle 52 the ends of the lever arms 42a and 42b are allowed, under the weight of the card holder 30 to spread apart, thus, retracting the lever holder 30.

In order to provide smooth and efficient operation of the vertical height adjustment means 40, and to prevent the card holder 30 from being deflected off axis and possibly binding or dropping the card 32, a series of guide slots 54 and 56 are provided. The guide slots 54 are elongated slots formed in the front wall 14 for accommodating pivot pins 44, or the pivot pin 50, which extend therethrough. The guide slots 54 allow motion of these pivot pins in a vertical direction but with substantially no horizontal deflection. Therefore, when the support structure 40 moves up and down, pivot pins are guided by the slots 54 and prevent the mechanism 40 from deflecting off to one side or the other and restricting it to solely vertical motion.

At the same time, one or more elongated guide slots 56 are formed in the rear wall 12 of the housing 20. These slots accommodate guide members 58 attached to and projecting from the back of the sign or card holder 30 which prevents the card holder 30 from tipping from side to side. The guide members 58 are somewhat elongated rectangular members which prevent rotation of the sign or card holder 30 about pivot point 60. This confines movement of the card holder 30 to a straight, vertical movement without tipping over or binding. Without the guide members 58 the card holder 30 would simply tip over uselessly to one side. This is true because the card holder 30 is attached to the vertical height adjustment means 40 using a single, central, pivot point in order to allow motion of the lever arms 42 and 48. Alternatively, the card holder 30 may be secured directly to the ends of a pair of levers 42a and 42b using pivot pins which slide laterally across the card holder 30 in a pair of horizontally extending slots in the base of the card holder 30. While this in fact may be desired for some applications, it provides a greater likelihood that there may be binding or materials catching in the structure during extension of the card holder 30 which could hamper the operation of the display device 10. Therefore, the preferred embodiment utilizes a single pivot point or pin 60 to secure the card holder 30 to the support device 40, and likewise employ the guiding members 58.

As shown in FIGS. 3 and 4, when the handle 52 is not being held, or has been released by a device 10 user, the weight of the card 32 and the card holder 30 generally forces the support means 40 to collapse or retract itself toward the pivot point 46. The pivots 44 and 50 slide along the slots 54 and the guide members 58 slide down along the length of the slots 56 in order to provide a non-binding, substantially vertical, motion for the support structure 40 and the card holder 30 as the card holder is retracted into the device 10. The final stopping position of the card holder 30, at full retraction, is determined by the minimum dimensions to which the support structure 40 will collapse or by placing a predetermined stop height for the guide members 58. That is, the slots 56 may be made to interact with the guides 58 to set the minimum height to which the card holder 30 will move into the housing 20. The slots 54 or 56 also determine the maximum extension of the device 40 by preventing further upward motion of either of the pivot pins 44 or the guides 58 respectively.

It may be desirable in some applications to form the rear wall 12 from a slightly thicker material than the front wall 12 in order to accommodate the added stress of the guides 58. It is contemplated that the guides 58 may have a larger amount of torque exerted thereon because of the weight as well as mechanical operation of the card 32. When people are inserting, removing, and otherwise moving cards 32 in and out of the display device 10 they tend to place a larger amount of force, especially in terms of torque, on the guides 58 which must be accommodated by the slot 56 and therefore, the rear wall 12.

At the same time, a cap or retainer 60 can be secured to the back of the guides 58 to prevent them from moving forward out of the slots 56. In extended positions of the support 40 the guides 58 will tend to slip out of the slots 56 under the weight of a card 32 or due to wind or other forces.

A further advantage may be realized in the present invention by providing the bottom portion of the lower slot 54 with at least one horizontally extending side slot or recess 64 for accommodating the pivot pin 50. One or two symmetrically placed recesses 64 may be utilized to accommodate the pivot pin 50. This allows the handle 52 to be moved sideways or laterally across the slot 54 to place the pivot 50 into one of the recesses 64 where it is locked in place and cannot slide back up along the slot 54 until moved by a display device 10 operator. Using this structure, the card holder 30 is locked in a vertically extended position when the handle 52 is pulled down and moved to one side so that the pivot 50 is confined in a recess 64. This has the advantage that an operator of the display device 10 is not required to continually hold the handle 52 in a down position in order to display a message. This has the added advantage that an operator can return their attention to the road or some other matter requiring more immediate attention and not worry about the card holder 30 falling back into the display device 10 while their attention is directed elsewhere.

The use of a downward motion for the operation of the handle 52 and the support structure 40, means that the display device 10 is not pushed upward which may otherwise dislodge the support frame or clip 68 from its support position.

While gravitational force has been described as the main motivating force for returning the card holder 30 to its retracted position, it will be apparent to those skilled in the art of mechanical apparatus that springs or other means can be installed in the display device 10 to assist the retraction of the card holder 30. That is, a coil spring may be inserted about one of the pivots 44 and coupled between a pair of lever arms 42a and 42b or otherwise attached between the housing 20 and the card holder 30 in order to exert a force which draws the card holder 30 back into the interior of the housing 20. While the preferred embodiment does not utilize such a spring structure in order to reduce costs and complications during manufacturing, it is contemplated that such a structure might be desired for certain applications, especially where there are high frictional forces preventing the ready movement of lever arms and guides.

The support arm 22 is generally dimensioned to interface with or accommodate a variety of vehicle doors or similar structures. The dimensions chosen are sufficient so that a planar portion 68 spans the width of a vehicle door structure between a window well and the interior side of the door and allows a vertical support member 69 to be inserted down into the window well and hold the display device 10 in a substantially vertical position. Exemplary widths for the planar portion 68 range between about 0.5 to 3.5 inches for a variety of automobile doors. If the planar member 68 is made too narrow then the back wall 12 of the housing 20 tends to interact with the side of a door and bends itself away from the door about one end of the planar member 68, causing the card holder 30 and the card 32 to extend at an angle to the side of the door, thus, tending to obscure part of the message as well as causing potential problems for binding during operation of the display device 10.

While the preferred embodiment uses a single unitary piece of material for the support arm 22 it is also possible to form the support member 68 as a two part assembly. That is, at least two planar surfaces may be joined together by adjustable screws or bolts which allow adjustment or variations in the width of the support member 68 so as to accommodate a variety of vehicle door widths. It is also possible to provide adjustment for the support member 68 so that display device 10 may be secured to other support structures other than the top edge of a vehicle door.

While the present invention provides a new type of sign display device that is very useful in vehicles, it also provides further advantages in the art if a means for holding additional message cards is provided. In addition, the sign display device 10 readily adapts itself for night time use. Both of these features are illustrated in FIGS. 7 and 8.

Figures 7, 8:
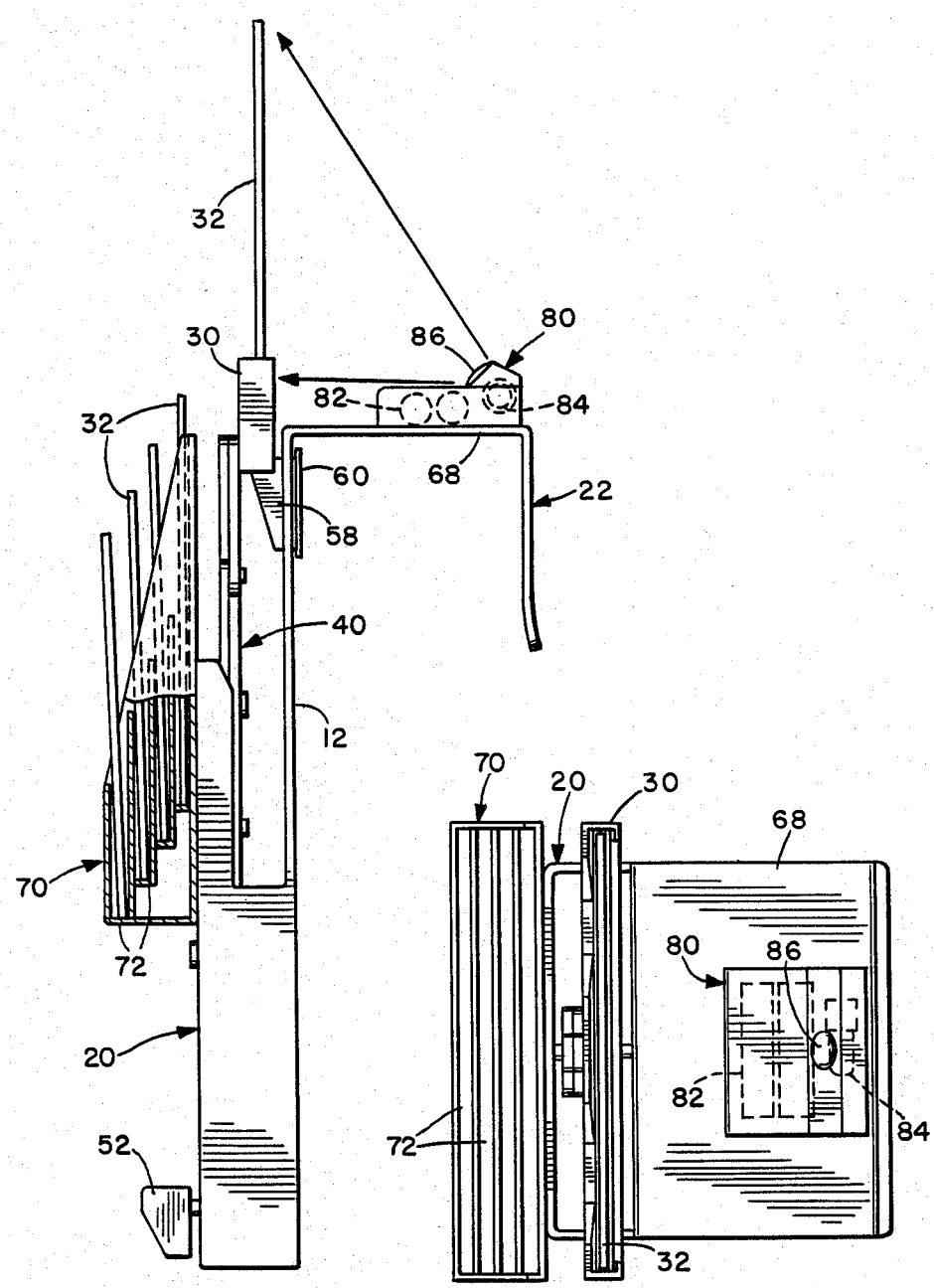
FIG. 7 is a side elevation view of the sign display device of FIG. 1 with a card holder and a card illuminator attached.
FIG. 8 is a top plan view of the sign display device of FIG. 7.

In the side view of FIG. 7, a sign or card holder 70 is shown attached to the front wall 14 of the display device 10. The sign holder 70 provides a series of slots 72 which are deep enough to hold and confine the signs 32 under most vehicle operating conditions. The sign holder 70 is manufactured from one of a variety of materials such as plastic. The sign holder 70 is secured to the front wall 14 using several means such as an adhesive for a permanent bond or a hook and loop fastener for a removable assembly. The holder 70 can also be mounted on a separate bracket for support by other surfaces.

In the views of FIGS. 7 and 8, a sign light 80 is illustrated in position on top of the support frame or clip 68. This light can comprise a variety of small light producing devices such as found in some automobile accessories. The preferred embodiment contemplates the use of a battery powered light which uses one or two small batteries 82 which are positioned within the light 80 housing to power a small flashlight type bulb. Since the sign 32 is meant to be read at some distance, the light bulb 84 is preferably of a quartz or similar type to project a very strong beam on the sign 32. Also, a small lens 86 is employed to focus the light onto the card or sign 32.

The cards 32 are made wide enough to accommodate messages of two or more words in length in a font size and type that can be comfortably read at a distance of 10 to 30 feet or more. Exemplary cards are on the order of about 3.5 to 6.5 inches square or in diameter (depending on geometric configuration chosen) with a preferred size being on the order of 5.25 to 5.50 inches across.

The cards 32 can comprise a variety of card stock or plastic material known for making signs including certain plastic laminated materials. In addition, a blank paper or card stock is provided for use by a device 10 operator to write messages on with a common pen or writing instrument. Alternatively, certain plastic coated or treated surfaces can be provided for use with wax or writing instruments which allow alteration or removal of messages by rubbing or wiping on the card 32.

The sign or card holder 30 is made wide enough to accommodate the dimensions of the cards 32. However, walls 12, 14, and 16 can be made wider or narrower than the card holder 30 depending upon the specific application. Material costs and ease of manufacturing generally dictate narrower widths while a minimum level of safety (covering the assembly 40) and aesthetics generally dictate wider widths. The principles of the present invention are equally applicable to a variety of widths for the walls 12, 14, and 16.

What has been described then is a new type of sign display device for vehicles which advances the art by providing for the display of pre-printed or spontaneously generated messages and storage out of a driver's field of vision.

The foregoing description of a preferred embodiment has been presented for purposes of illustration and description. It is not intended to be exhaustive nor to limit the invention to the precise form disclosed, and many modifications and variations are possible in light of the above teaching. The embodiment was chosen to describe and best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What is claimed is:

1. A device for displaying signs in vehicles, while said vehicles move or are at rest, said signs having predetermined dimensions and geometric shapes, comprising:
   a frame;
   a support arm attached to an upper portion of said frame and being dimensioned to be secured to a support surface of said vehicle;
   variable height sign holding means mounted on said frame for supporting said signs along a portion of a perimeter thereof, and for moving said signs along a vertical axis between a retracted position below said support arm adjacent said frame and an extended position above said support arm, said variable height sign holding means comprising:
   a plurality of adjacent pairs of lever arms, each pair comprising two lever arms of predetermined length rotatably joined together at a center point, each pair being joined to adjacent pairs by rotatably joining the ends thereof; and at least one pair of actuation lever arms of one-half length pivotally joined together on one end and to the lever arms on the other; and actuation means secured to said sign holding means for manually actuating the extension thereof.

2. The display device of claim 1 wherein said frame comprises generally rectangular back, bottom, and front walls, with said back and front walls being joined on a bottom edge to said bottom wall.

3. The display device of claim 2 wherein said walls are dimensioned to hide from view substantially all of said sign and said variable height support means in the retracted position.

4. The display device of claim 1 wherein said support arm comprises a planar surface extending substantially perpendicular to said back wall, said arm further comprising a vertical support clip mounted on an outer end thereof.

5. The display device of claim 4 wherein said planar surface further comprises first and second support arms adjustably coupled together.

6. The display device of claim 1 wherein said actuation means further comprises a handle secured to a pivot pin attached to lowermost ends of said actuation levers.

7. The display device of claim 1 wherein said variable height sign holding means further comprises a bracket having a slotted upper support surface for insertion and support of said signs.

8. The display device of claims 7 wherein said bracket comprises a generally rectangular block having said slot formed therein along upward facing edges.

9. The display device of claim 8 wherein said block has at least one triangular depression therein and said signs have at least one matching triangular projection therein.

10. The display device of claim 7 wherein said bracket comprises a block of material having an arcuate slot formed thereon.

11. The display device of claim 2 further comprising:
a first pivot pin secured at a center point of a first pair of said levers and secured to either said front or back wall in a fixed vertical position;
a vertically extending guide slot in at least one of said front or back walls; and
at least a second pivot pin secured to a second pair of said levers so as to extend through said vertical guide slot.

12. The display device of claim 11 further comprising at least a second guide slot disposed vertically in said back wall; and
a guide member secured to said sign holding means and having a generally rectangular projection extending into said second guide slot.

13. The display device of claim 1 wherein said signs comprise planar material having preprinted messages thereon and a tapered edge along at least a lower portion for interacting with said sign holding means.

14. The display device of claim 13 wherein said signs comprise a coated planar material capable of having messages removably recorded thereon by a device user.

15. The display device of claim 1 further comprising illumination means for projecting a light beam on said signs in an extended or displayed position.

16. The display device of claim 15 wherein said illumination means comprises:
a housing secured to said frame adjacent said support arm;
a switchable electrical source;
an electrical light source disposed in said housing and connected to said electrical source; and
a lens disposed adjacent said light source for focusing light emitted thereby on said signs.

17. The display device of claim 1 further comprising storage means for storing a plurality of signs when not being supported by said sign holding means, said storage means comprising:
a storage frame having a plurality of substantially parallel support ledges formed thereon, each ledge being wider than a sign is thick;
a plurality of vertically extending walls secured along edges of said ledges, being spaced apart far enough to allow the insertion of signs therebetween and being tall enough to prevent signs from falling off of said ledges but not covering all of said signs; and
means for attaching said storage frame to said device frame.

18. The display device of claim 17 wherein said ledges are positioned at varying vertical heights with respect to each other, said heights varying in a predetermined stepwise manner.

* * * * *